United States Patent [19]

Farrow et al.

[11] Patent Number: 4,825,459
[45] Date of Patent: Apr. 25, 1989

[54] LOCAL LOOP TEST ARRANGEMENT IN AN ECHO CANCELLER BASED FULL DUPLEX MODEM

[75] Inventors: Cecil W. Farrow, Highlands; William E. Keasler, Jr., Tinton Falls; Joseph Maruscsak, Howell; David G. Shaw, Middletown, all of N.J.

[73] Assignees: American Telephone and Telegraph Company, New York, N.Y.; AT&T Information Systems Inc., Morristown, N.J.

[21] Appl. No.: 814,673

[22] Filed: Dec. 30, 1985

[51] Int. Cl.$^4$ .................. H04B 17/00; H04B 3/23
[52] U.S. Cl. ........................ 379/3; 375/10; 379/410
[58] Field of Search ............ 370/13, 15, 32, 32.1; 375/10; 379/3, 407, 410, 411

[56] References Cited

U.S. PATENT DOCUMENTS

| | | | |
|---|---|---|---|
| 4,464,545 | 8/1984 | Werner | 370/32.1 |
| 4,547,633 | 10/1985 | Szechenyi | 370/13 |
| 4,549,049 | 10/1985 | Guidoux | 375/10 |
| 4,594,479 | 6/1986 | Farrow et al. | 373/3 |

Primary Examiner—Jin F. Ng
Assistant Examiner—Randall P. Myers
Attorney, Agent, or Firm—Barry H. Freedman; Ronald D. Slusky

[57] ABSTRACT

In accordance with the present invention, local loop testing in an echo canceller based modem is provided in a manner in which proper operation of both the receiver and echo canceller can be assessed simultaneously. Specifically, the modem includes means for generating data and interfering symbol sequences and for applying the interfering sequence to both the echo canceller and the modem transmitter, while applying the data sequence only to either the transmitter or the echo canceller. During closed loop testing, the modem connection to the transmission line is opened, and a portion of the output of the modem transmitter is applied to the modem receiver via a leakage path through the hybrid. The received symbol is subtracted from the echo canceller output, resulting in application to the receiver of only a version of the data symbol sequence. Advanced knowledge of the characteristics of the data symbol sequence allows proper receiver operation to be verified.

11 Claims, 3 Drawing Sheets

LOCAL LOOP TEST ARRANGEMENT IN AN ECHO CANCELLER BASED FULL DUPLEX MODEM

FIELD OF THE INVENTION

This invention relates generally to full duplex modems of data sets which incorporate echo cancellation apparatus and, in particular, to such modems in which a local loop test is provided to assess proper operation of the modem.

BACKGROUND OF THE INVENTION

State of the art full duplex modems typically include echo cancellation apparatus in order to eliminate contamination of the received signal by echoes of the transmitted signal. Many such modems are also arranged to provide a local loop test to assess modem performance. During a test, the output of the modem's transmitter is intentionally allowed to reach the input of the modem's receiver via the hybrid circuit which normally connects the modem to the transmission line, and the connection to the transmission line is opened. In this configuration, a test signal sequence applied to the transmitter is cancelled by the echo canceller within the modem, rendering any test of proper receiver operation ineffective. Consequently, it has been common to disable the echo canceller during testing. However, this procedure does not then test operation of the echo canceller.

SUMMARY OF THE INVENTION

In accordance with the present invention, local loop testing in an echo canceller based modem is provided in a manner in which proper operation of both the receiver and echo canceller can be assessed simultaneously. Applicants' modem includes means for generating a first symbol sequence called an "interfering" symbol sequence which is applied to both the echo canceller and the modem transmitter. The modem is also arranged to apply a "data" symbol sequence, generated by customer terminal equipment or within the modem itself, to either the transmitter or the canceller. When a closed loop test is performed, the modem connection to the transmission line is opened, and a portion of the transmitter output is applied to the modem incoming leg via a leakage path through the hybrid. In a first embodiment of the invention, in which the data symbol sequence is applied only to the modem transmitter, the signal present in the modem receiver leg includes components representing both the data and interfering symbols, while the echo canceller output represents only the interfering symbols. The difference between the incoming signal and the canceller output is then formed, resulting in application to the modem receiver of a signal representing only a version of the data symbol sequence. Advanced knowledge of its characteristics allows proper receiver operation to be tested.

In a second embodiment, in which the data symbol sequence is applied only to the echo canceller, the signal present in the receiver leg now represents only the interfering symbols, while the echo canceller output represents both the data and interfering symbols. The difference between the incoming signal and the canceller output, as in the first embodiment, represents only a version of the data symbols, allowing verification of proper receiver performance. Because at least one sequence is applied to the echo canceller, its proper operation may be verified by monitoring the canceller output.

BRIEF DESCRIPTION OF THE DRAWING

The features, advantages and other details of the present invention will be appreciated by consideration of the following detailed description when read in light of the accompanying drawing in which.

DETAILED DESCRIPTION

Figure 1:
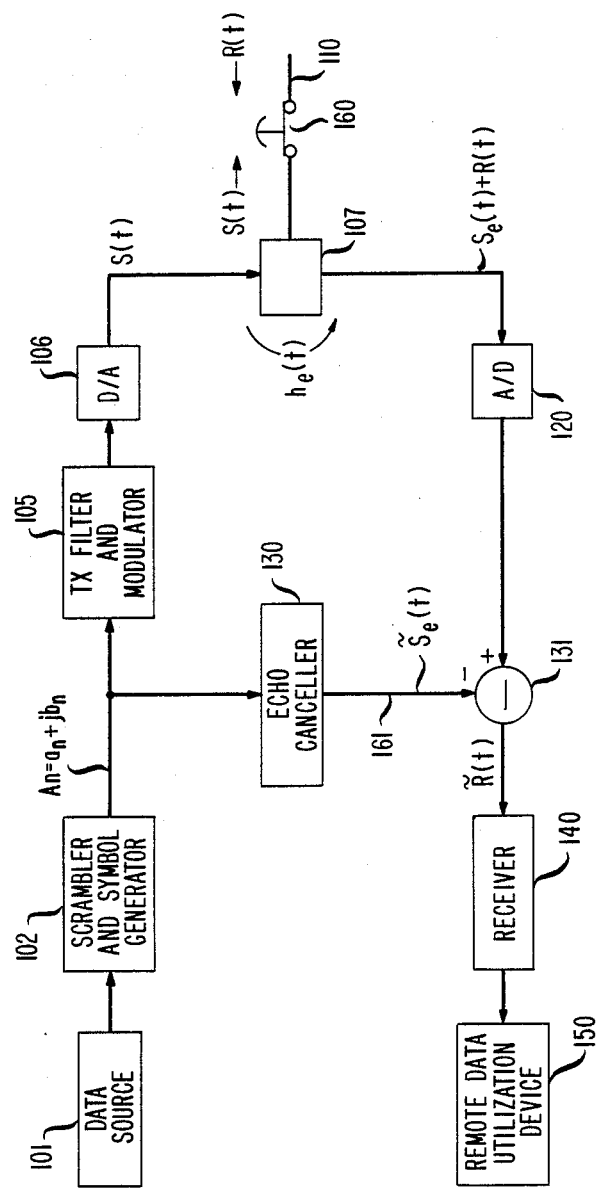
FIG. 1 is a block diagram of a prior art echo canceller based modem showing the signals present at various points within the modem during normal data transmission.

Referring first to FIG. 1, there is shown a block diagram of a conventional echo canceller based modem. Data from a data source 101 is applied to a conventional scrambler and symbol generator 102 to obtain a sequence of complex symbols $A_n = a_n + jb_n$, where n is an index representing successive complex symbols. The output of scrambler and symbol generator 102 is processed by a transmit filter and modulator 105 and a digital-to-analog converter 106, to generate the real part of a two-dimensional (in-phase and quadrature) modulated signal S(t) generally represented by the expression $$S(t) = Re\left[\sum_n A_n g(t - nT) e^{jw_c t}\right] \quad (1)$$

where g(t) is a Nyquist pulse, 1/T is the symbol rate, $w_c/2\pi$ is the carrier frequency, and Re denotes the real part of the quantity inside the brackets. The transmitted signal S(t) is applied to a transmission medium 110 which connects the modem of FIG. 1 to a similar modem at a remote location. The connection to transmission line 110 is made via a hybrid circuit 107, which is intended to isolate the transmitted signal S(t) from the analog signal R(t) received via transmission medium 110 from the remote modem. Because hybrid 107 is not ideal, an echo $S_e(t)$ of the signal energy contained in the transmitted signal S(t) is leaked through the hybrid and becomes combined with R(t) where $S_e(t)$ is the convolution of S(t) and the impulse response of the hybrid leakage path.

To compensate for the leakage through hybrid 107, and assure that only information representing the received signal R(t) is applied to a receiver 140, the modem in FIG. 1 includes an echo canceller circuit 130 which receives an input representing $a_n + jb_n$ from scrambler and symbol generator 102. Echo canceller 130, which may be a finite impulse response filter, is designed to form a replica $\bar{S}_e(t)$ of the echo component of the transmitted signal S(t) by forming the product of a series of recursively updated canceller coefficients $C_n$ which model the characteristics of the transmitter echo path including D/A converter 106, hybrid 107 and A/D converter 120 an any other linear components 106, 107 and 120 with a series $A_n$ of stored symbol values. The output of canceller 130 is given by $$\sum_{l=0}^{N-1} A(n-l)C(n,l) \quad (2)$$

where $$C(n+1,l) = C(n,l) - \beta A(n-l)E(n) \quad (3)$$

l is an index, l=0, 1, 2 ... N−1, $\beta$ is a scaling factor, and $E_n$ is an error representing the difference between the echo canceller output and the echo being replicated. The output of canceller 130 is combined in a subtractor circuit 131 with a digital version of the received signal (as corrupted by the echo component) formed in A/D converter 120. Under ideal conditions, the output R(t) of subtractor 131 represents only the received signal $\bar{R}(t)$. This reconstructed signal is applied to echo canceller 130 on line 132, for the purpose of coefficient updating, and to receiver 140, which is conventionally arranged such that the remotely generated data is demodulated, decoded, unscrambled and applied to a suitable utilization device 150.

Under conditions where the operation of the modem of FIG. 1 is to be tested, a switch 160 interposed at the transmission line side of hybrid 107 is opened. In this event, no remotely generated signal is present and $\bar{R}(t)$ contains little or no energy, independent of the value of any test sequence applied from data source 101. Accordingly, operation of receiver 140 is not tested. To obviate this problem, it is customary to disable the operation of echo canceller 130 by, for example, setting the coefficients $C_n$ to zero. In that event, the signal applied to receiver 140 will be $S_e(t)$ and operation of receiver 140 can be assessed by, for example, comparing the resulting data sequence with the original test sequence. However, with echo canceller 130 disabled, its operation cannot be monitored.

Figure 2:
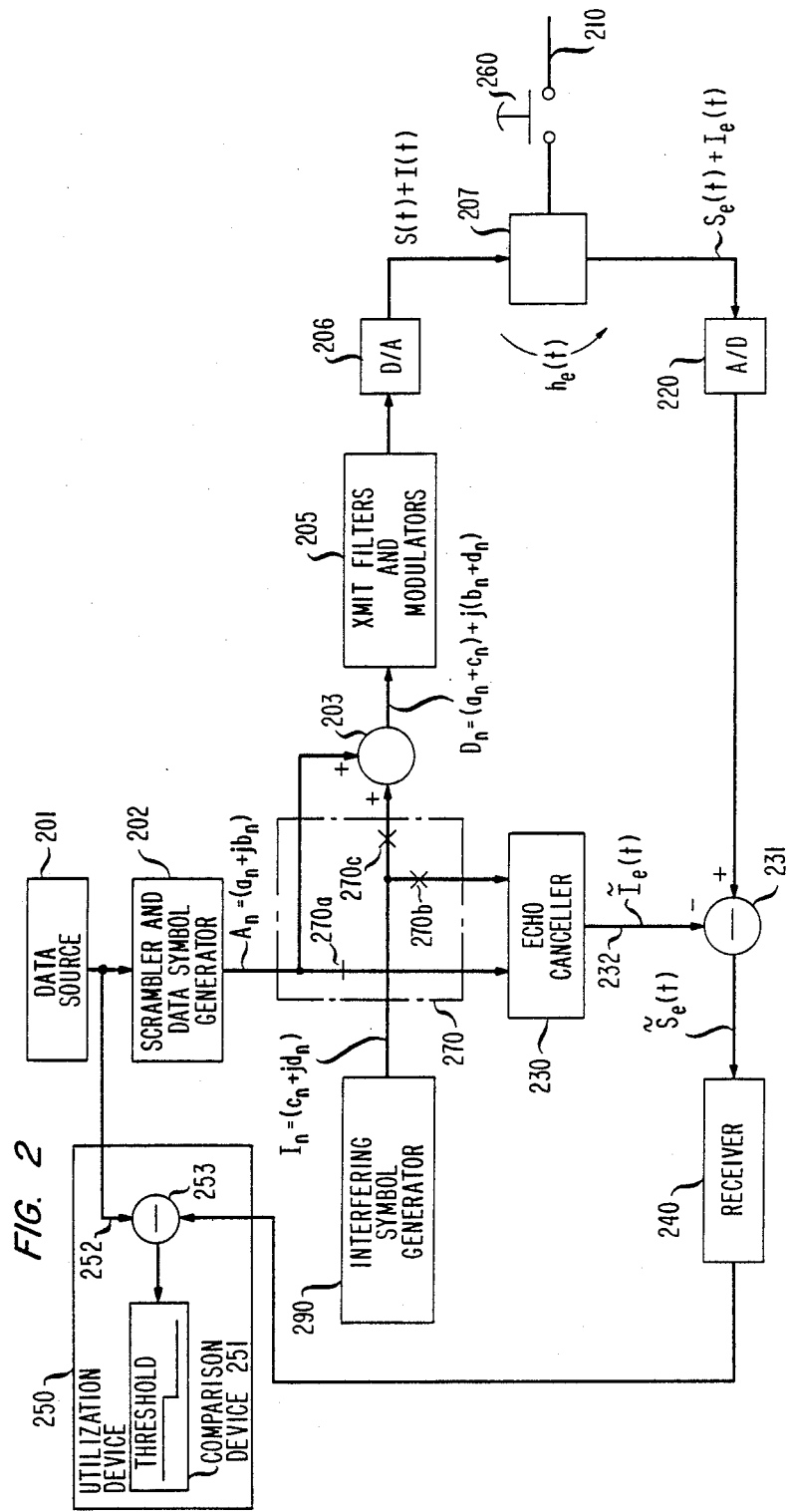
FIG. 2 is a block diagram of an echo canceller based full duplex modem including a first embodiment of an arrangement in accordance with the present invention for permitting closed loop testing in which both the echo canceller and receiver portions of the modem are tested.
Figure 3:
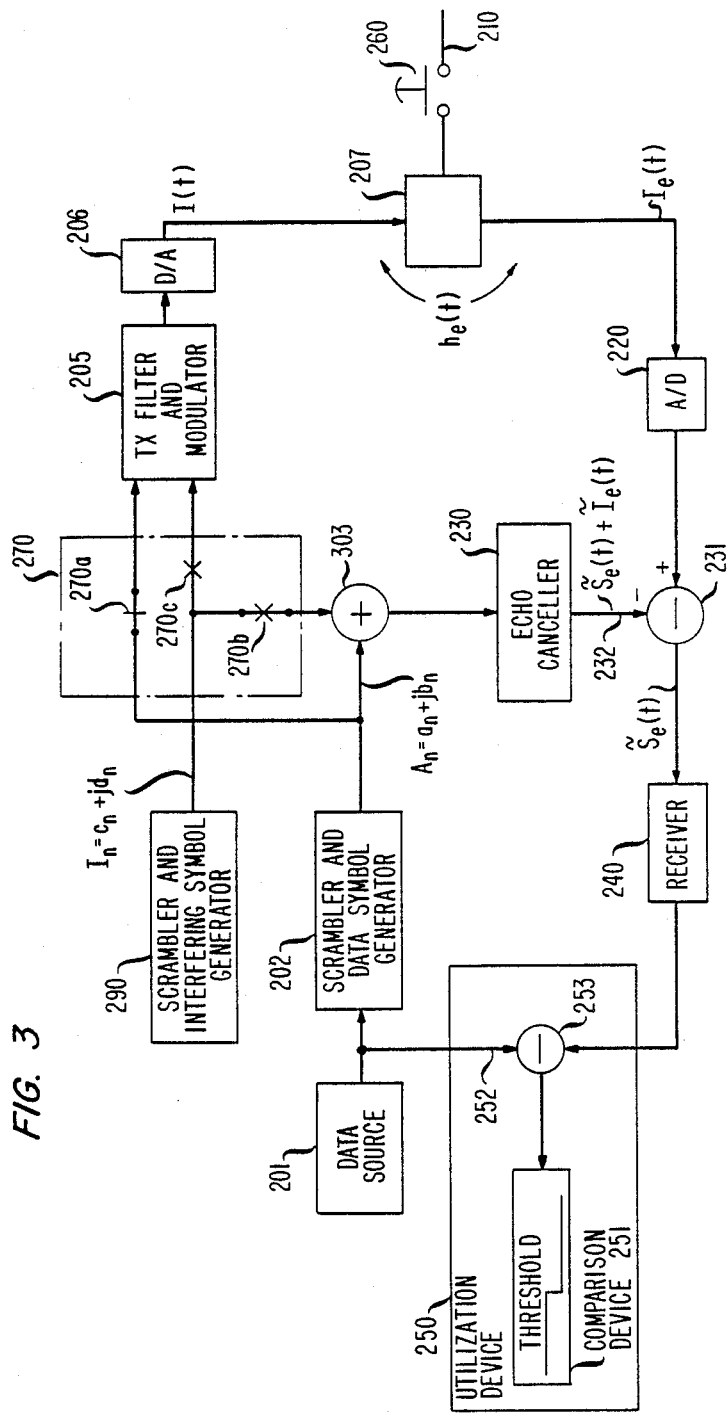
FIG. 3 is a block diagram of a second embodiment of the present invention.

In accordance with the present invention, assessment of proper data set operation including operation of both the echo canceller and the receiver circuits is enabled using the apparatus shown in either FIG. 2 or FIG. 3. In the FIG. 2 arrangement, data from data source 201 is again processed in a scrambler and data symbol generator 202 to generate a sequence of discrete valued multi-level complex symbols $A_n = a_n + jb_n$. During normal (non-test) operation, contact 270a of a switch 270 is closed and contacts 270b and 270c are open, so that symbols from generator 202 are processed in a manner identical to that shown in FIG. 1.

Also provided in the modem of FIG. 2 is an interfering symbol generator 290 which is activated only during closed loop testing, at which time contact 270a is opened and contacts 270b and 270c closed. Generator 290 is arranged to generate a second set of symbols $I_n = c_n + jd_n$ which are combined with the output of generator 202 in an adder circuit 203 to yield a composite signal $D_n = (a_n + c_n) + j(b_n + d_n)$. The symbol sequence $I_n$ output from interfering symbol generator 290 is also applied to echo canceller 230 during closed loop testing, but the canceller does not receive symbols from data symbol generator 202 at this time.

In the closed loop test mode, the composite symbol sequence $D_n$ is applied to transmit filters and modulator 205 to generate a composite modulated signal given by $$S(t) + I(t) = Re \sum_{n=1}^{N} [a+c]_n + j[b+d]_n \, g(t-nT) \, e^{-j\omega_c t} \quad (4)$$

which is applied to D/A converter 206. One component S(t) of the composite signal is attributable to the data symbol sequence, while the other component I(t) is attributable to the interfering symbols. The passband signal output of converter 206 is coupled via hybrid 207 to transmission line 210, through normally closed switch 260 (which has been opened during testing).

When a closed loop test is performed, a fraction $S_e(t) + I_e(t)$ of the composite signal output of filters and modulator 205 is passed through hybrid 207 and applied to a first input of subtractor 231 via A/D converter 220. In this arrangement, the second input to subtractor 231, derived from echo canceller 230, replicates only a portion $I_e(t)$ of the composite signal, since the coefficients $C_n$ in echo canceller 230 will adapt to minimize only the component $I_e(t)$ in the receive path because the symbols $I_n$ generated by interfering symbol generator 290 are correlated only with $I_e(t)$ and not with $S_e(t)$. As a result, the output of subtractor circuit 231 is $\tilde{S}_e(t)$, representing a fraction of the original data sequence $A_n$. When this signal, which is applied to canceller 230 on line 232, for the purpose of coefficient updating, is applied to receiver 240, a representation of the original symbol sequence $a_n + jb_n$ derived from generator 202 is recovered. This data may be applied to a utilization device 250, which, in a self test environment, could include a circuit for verifying that the received representation is the same as the original data symbol sequence, using, for example, a comparison device 251, which receives an input from data source 201 on line 252. Alternatively, verification of proper operation could be obtained from analysis of the received representation itself. For example, the error or difference, the output of subtractor 253, between the received signal and its expected values could be computed and compared to a threshold in a manner similar to that employed in decision directed equalizers. It is also to be noted that the user could generate and check and data sequence external to the data set.

By virtue of the arrangement of the present invention, it is seen that the operation of receiver 240 can be monitored during closed loop testing by comparing the output $a_n + jb_n$ of receiver 240 with the symbol sequence generated by data symbol generator 202, or by otherwise computing a measure of the correctness of the received signal obtained by analyzing that signal itself. During closed loop operation, echo canceller 230 is not disabled, but rather operates normally; its operation is tested by assuring that the sequence $I_n = c_n + jd_n$ is cancelled.

A second embodiment of the present invention is illustrated in block diagram form in FIG. 3. In this figure, like elements from FIG. 2 have retained like designations.

As shown in FIG. 3, adder circuit 303 is located just prior to the input to canceller 230. In this configuration, during normal operation, a data symbol sequence $A_n = a_n + jb_n$ generated by scrambler and symbol generator 202 in response to data output from data source 201 is applied to both transmit filter and modulator 205 and to echo canceller 230 via adder circuit 303. During such normal operation, contact 270b is open, so that the input to echo canceller 230 is derived solely from generator 202. When a closed loop test is initiated, contact 270a is opened, so that the data symbol sequence is applied only to canceller 230. During such testing, a second symbol sequence $I_n = c_n + jd_n$ provided by scrambler and interfering symbol generator 290 is applied both the canceller 230 via adder 303 and to filter and modulator 205. The output I(t) of transmit filter and modulator 205 is given by:

$$I(t) = Re \sum_n I_n g(t - nT) e^{j\omega_c t} \quad (5)$$

During closed loop testing, a portion $I_e(t)$ of the transmit signal is leaked through hybrid 207 and applied to a first input of subtractor 231 via A/D converter 220. The second input to subtractor 231 is the output of echo canceller 230. Since, in this embodiment, the input to canceller 230 is the sum (formed in adder circuit 303) of the data and interfering symbol sequences $A_n$ and $I_n$, respectively, its output under closed loop testing conditions, is given by $(\bar{I}_e(t) + \bar{S}_e(t))$, where the quantity inside the brackets is an estimate of the signal $I_e(t)$ which has leaked through hybrid 207, plus an image of the symbol sequence $A_n$ applied directly to the canceller. This operation can be explained as follows. Echo canceller 230 is arranged to adapt the coefficients $C_n$ mentioned previously to minimize the signal output of subtractor 231. This minimization can only occur respect to input symbols to echo canceller 230 that are correlated with the uncancelled received signal applied to A/D converter 220. In the embodiment of FIG. 3, during closed loop testing, the only symbols applied to canceller 230 that are correlated to the signal $I_e(t)$ are the symbols $I_n$ generated by interfering symbol generator 290. Accordingly a portion of the output of echo canceller 230 is given by $\bar{I}_e(t)$. However, because the symbols applied to echo canceller 230 also include a component $A_n$ derived from scrambler and data generator 202, the output of echo canceller 230 will also include a component $\bar{S}_e(t)$ which is effectively the modulation of symbols $A_n$ with coefficients $C_n$ stored in the echo canceller 230. Accordingly, the output of subtractor 231 is $\bar{S}_e(t)$, representing the difference between the output of canceller 230 and the output of A/D converter 220. This signal after processing in receiver 240, results in recovery of a replica of the data symbol sequence produced by data source 201, allowing proper operation of the receiver circuitry to be verified.

Either embodiment of the present invention can be practiced in a local loop "self test" in which data source 201 is contained internal to the modem, or, alternatively, in a "user data" local loop test in which data symbol sequence $A_n$ is generated in response to data provided by external digital terminal equipment connected to the modem. In either event, the same advantageous results are produced.

The two sets of symbols $A_n$ and $I_n$ generated in the modem of FIG. 2 are preferably arranged to be uncorrelated signals, in order to avoid any undue cancellation of I(t) during the closed loop testing process. This result can be assured by using the alternate scrambler (normally present in state of the art modem apparatus) to process the output of interfering symbol generator 290.

Various modifications of the present invention may be made by persons skilled in the art. For example, the invention may be used with many types of echo cancellers, including data driven echo cancellers. Accordingly, it should be understood that the invention is limited only by the scope of the appended claims.

What is claimed is:

1. Apparatus for testing the operation of a data set which comprises a transmitter, receiving means including a receiver and an echo canceller, said receiving means being responsive to the output of said echo canceller and an input signal received from a remote location via a transmission medium, said apparatus including means operable during a test for disabling a connection between said data set and said transmission medium connecting said data set to said remote location, so that a portion of the output of said data set is applied at the input to said data set, means operable during said test for applying a first symbol sequence to both said transmitter and to said echo canceller, and means for applying a second symbol sequence to one of said transmitter and said echo canceller during said test, at which time said second symbol sequence is applied concurrently with said first symbol sequence, and means responsive to said second symbol sequence and the output of said receiving means for testing operation of said receiver.

2. The apparatus defined in claim 1 wherein said testing means is arranged to compare said output of said receiver with said second symbol sequence.

3. The apparatus defined in claim 1 wherein said testing means is arranged to compare the difference between said output of said receiver and the value of the applied second symbol sequence with a threshold.

4. The apparatus defined in claim 1 wherein said first and second symbol sequences are uncorrelated.

5. In a data set including:
   a transmitter responsive to a first signal for generating an output signal for application to a transmission medium,
   an echo canceller normally responsive to said first signal for providing a cancellation signal representing a replica of the echo component appearing in a signal received by said data set from a remote location via said transmission medium, and
   a receiver responsive to the difference between said cancellation signal and said received signal for generating a received symbol sequence, and
   apparatus for testing said receiver, said apparatus including means for disabling a connection between said data set and said transmission medium so that a portion of said output signal forms said received signal, means for providing a second signal to one of said transmitter and said echo canceller, said second signal being uncorrelated with said first signal, and means for testing said receiver in response to at least the received symbol sequence.

6. In a data set including:
   a transmitter responsive to a first symbol sequence for generating an output signal for application to a transmission medium,
   an echo canceller responsive to application of a second symbol sequence for providing a cancellation signal which is a replica of echoes generated in said data set in response to said output signal, said first and second symbol sequences normally being identical, and
   a receiver responsive to the difference between said cancellation signal and a signal received from a remote location via said transmission medium for generating a received symbol sequence, and apparatus for testing said receiver, said apparatus including means for disabling application of said output signal to said transmission medium so that a portion of said output signal forms said received signal, means operable during testing for applying as said second symbol sequence a sequence which is distinct from and uncorrelated with said first symbol sequence, and means for testing said receiver in response to at least the received symbol sequence.

7. Apparatus for testing a receiver in of a data set which comprises a transmitter responsive to an applied symbol sequence for generating an output signal, an echo canceller responsive to said applied symbol sequence for providing a cancellation signal representing an echo generated in response to said output signal, and receiving means including said receiver, said receiving means being responsive to said cancellation signal and an input signal received from a remote location via a transmission medium for generating a replica of the symbol sequence applied to a data set connected to said medium at said remote location, wherein said testing apparatus includes:

means operable during a test for disabling a connection between said data set and said transmission medium, so that a portion of the output of said data set is applied at the input to said data set, means operable during said test for applying a first symbol sequence to both said transmitter and to said echo canceller, means for applying a second symbol sequence to one of said transmitter and said echo canceller during said test, at which time said second symbol sequence is applied concurrently with said first symbol sequence, and means for testing said receiver by comparing the produced output of said receiver with said second symbol sequence.

8. Apparatus for performing a closed loop test of the operation of a receiver in a data set by applying to said receiver a signal which is a combination of a portion of the output of a transmitter in said data set with the output of an echo canceller in said data set, said apparatus including means operable during said closed loop test for applying a first symbol sequence to both said transmitter and to said echo canceller, means for applying a second symbol sequence to one of said transmitter and said echo canceller during said closed loop test, at which time said second symbol sequence is applied concurrently with said first symbol sequence, and means for testing said receiver by comparing the output of said receiver with said second symbol sequence.

9. A method for performing a closed loop test of the operation of a receiver in a data set by applying to said receiver a signal which is a combination of a portion of the output of a transmitter in said data set with the output of an echo canceller in said data set, said method including the steps of applying during said closed loop test a first symbol sequence to both said transmitter and to said echo canceller, applying a second symbol sequence to one of said transmitter and said echo canceller during said closed loop test, at which time said second symbol sequence is applied concurrently with said first symbol sequence, and testing said receiver by comparing the output of said receiver produced with a portion of the output of said transmitter is applied to said receiver, with said second symbol sequence.

10. A method of testing the operation of a receiver in a data set, including the steps of disabling during a test a connection between the output of said data set and a transmission medium connecting said data set to a remote location, so that a portion of the output of said data set is applied at the input of said data set, applying during said test a first symbol sequence to both a transmitter circuit in said data set and to an echo canceller circuit in said data set, applying a second symbol sequence to one of said transmitter circuit and said echo canceller circuit during said test, at which time said second symbol sequence is applied concurrently with said first symbol sequence, applying the difference between the output of said echo canceller circuit and a portion of the output of said transmitter circuit to the input of said receiver, and testing said receiver by comparing the difference between the output of said receiver and the value of the applied second symbol sequence to a threshold.

11. A method of testing the operation of a data set which comprises a transmitter, receiving means including a receiver, and an echo canceller, said receiving means being responsive to the output of said echo canceller and an input signal received from a remote location via a transmission medium, said method including the steps of disabling during a test the connection between said data set and said transmission medium connecting said data set to said remote location, so that a portion of the output of said data set is applied to the input to said data set, applying during said test a first symbol sequence to both a transmitter in said data set and to said echo canceller, applying a second symbol sequence to one of said transmitter and said echo canceller during said test, at which time said second symbol sequence is applied concurrently with said first symbol sequence, and testing said receiver by comparing the output of said receiver with said second symbol sequence.

* * * * *